US008165045B2

(12) United States Patent
Chan

(10) Patent No.: US 8,165,045 B2
(45) Date of Patent: Apr. 24, 2012

(54) MOBILE WIRELESS COMMUNICATIONS DEVICE INCLUDING A POWER DIVIDER CONNECTING AN LNA TO MULTIPLE RECEIVE SIGNAL CHAINS

(75) Inventor: Wen-Yen Chan, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 279 days.

(21) Appl. No.: 12/394,187

(22) Filed: Feb. 27, 2009

(65) Prior Publication Data

US 2010/0220636 A1 Sep. 2, 2010

(51) Int. Cl.
*H04B 7/185* (2006.01)
*H04B 7/005* (2006.01)

(52) U.S. Cl. ........................................ 370/278; 370/318

(58) Field of Classification Search .................. 370/275, 370/276, 277, 278, 279, 282, 330, 335, 341, 370/342, 441; 455/127.1, 127.2, 67.11, 115.1, 455/424, 67.4, 423; 324/95, 142
See application file for complete search history.

(56) References Cited

U.S. PATENT DOCUMENTS 6,094,577 A * 7/2000 Han .............................. 455/424
6,133,793 A 10/2000 Lau et al. ...................... 330/302
6,847,686 B2 1/2005 Morad et al. ............. 375/240.16
6,903,542 B2 * 6/2005 Ives ................................ 324/95
7,113,035 B2 * 9/2006 Koukkari et al. ............. 330/136
7,187,230 B2 3/2007 Vilhonen ...................... 327/552
7,193,475 B2 3/2007 Su et al. ........................ 330/301
7,574,211 B2 * 8/2009 Hata ............................. 455/436
2002/0196755 A1 12/2002 Hidaka et al. ................. 370/335
2003/0210093 A1 * 11/2003 Zhang ........................... 330/149
2005/0197080 A1 9/2005 Ulupinar et al. .............. 455/135
2006/0182069 A1 8/2006 Yu ................................. 370/335
2007/0184811 A1 8/2007 Ballantyne ................. 455/343.2
2007/0207751 A1 9/2007 Behzad et al. ................ 455/132

FOREIGN PATENT DOCUMENTS

WO 2006/124550 11/2006

* cited by examiner

*Primary Examiner* — Hanh Nguyen
(74) *Attorney, Agent, or Firm* — Allen, Dyer, Doppelt, Milbrath & Gilchrist, P.A.

(57) ABSTRACT

A mobile wireless communications device may include an antenna, a wireless radio frequency (RF) receiver, a wireless RF transmitter, and a duplexer connecting the wireless RF receiver and the wireless RF transmitter to the antenna. More particularly, the wireless RF receiver may include a low noise amplifier (LNA) connected to the duplexer, a first receive signal chain for wireless communications signals having a first signal type downstream from the LNA, a second receive signal chain for wireless communications signals having a second signal type different than the first frequency band downstream from the LNA, and a power divider connecting the LNA to the first and second receive signal chains.

18 Claims, 6 Drawing Sheets

MOBILE WIRELESS COMMUNICATIONS DEVICE INCLUDING A POWER DIVIDER CONNECTING AN LNA TO MULTIPLE RECEIVE SIGNAL CHAINS

FIELD OF THE INVENTION

The present invention relates to the field of wireless communications devices, and, more particularly, to receiver systems for mobile wireless communications devices and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Accordingly, there is a continual evolution in cellular communications formats that can not only provide desired voice communication coverage, but also which can provide higher throughputs for data intensive applications such as Web browsing, digital file transfer, etc. As a result, different cellular protocols or formats are often layered upon one another as technology progresses. One example is in Code Division Multiple Access (CDMA) systems, such as CDMA2000 systems. CDMA2000 is a hybrid system that uses both second and third generation (3G) formats to cover both voice and data communications. More particular, the CDMA 1xRTT (1X) format is the core CDMA2000 wireless air interface standard and is the basic or default service communications format provided by cellular base stations for both voice and data.

On the other hand, Evolution-Data Optimized (EVDO) is a 3G CDMA telecommunications standard for the wireless transmission of data through radio signals, typically for broadband Internet access. However, CDMA 1X and EVDO may utilize different frequency bands, or they may both share the same frequency bands but use different coding. Moreover, cellular network providers often do not have the infrastructure in place at all of their base stations to provide seamless EVDO coverage. As such, it becomes necessary for CDMA cellular devices to monitor paging channels from different cellular base stations to fill in these “holes” in the network, to provide voice coverage (as EVDO is generally not well suited to voice traffic), and to determine when the higher data throughput EVDO option is available to provide enhanced performance.

One exemplary system for monitoring paging channels from different network formats is disclosed in U.S. patent pub. No. 2006/0182069. More particularly, the system permits a network, such as a data only network (e.g., CDMA2000 1X-EVDO), with which a mobile terminal is not currently communicating to notify the mobile terminal that the network desires to establish communication with the mobile terminal, even in instances in which the mobile terminal is actively communicating via another network, such as a voice and data network (e.g., CDMA2000 1X) and has stopped monitoring for paging messages. The mobile terminal can then end communications with the network with which it has been previously communicating and commence communications with the other network that has transmitted the paging message. For example, a mobile terminal may terminate voice communications via a voice and data network in order to receive an MMS message via a data only network upon receiving notification that the data only network desires to establish a communications session with the mobile terminal.

Despite the advantages of such approaches, further developments may be desirable in mobile wireless communications devices for monitoring the availability of different communications formats, particularly cellular devices.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a mobile wireless communications device is disclosed herein which may include an antenna, a wireless radio frequency (RF) receiver, a wireless RF transmitter, and a duplexer connecting the wireless RF receiver and the wireless RF transmitter to the antenna. More particularly, the wireless RF receiver may include a low noise amplifier (LNA) connected to the duplexer, a first receive signal chain for wireless communications signals having a first signal type downstream from the LNA, a second receive signal chain for wireless communications signals having a second signal type different than the first signal type downstream from the LNA, and a power divider connecting the LNA to the first and second receive signal chains.

In accordance with one embodiment, the first receive signal chain may have a first data rate, and the second receive signal chain may have a second data rate greater than the first data rate. Additionally, at least one of the first and second signal chains may also process voice communications. By way of embodiment, the first signal type for the first receive signal chain may be CDMA2000 1X, and the second signal type for the second receive signal chain may be CDMA2000 1X-EVDO.

The wireless RF receiver may further include a filter between the LNA and the power divider. Moreover, the first receive signal chain may include a first mixer, and the second receive signal chain may include a second mixer. In accordance with one embodiment, the power divider may include a directional coupler. Also by way of example, the power divider may include at least one of a resistive divider, a resistive tap, a reactive load divider, and a reactive tap.

A related mobile wireless communications method may include providing a mobile wireless communications device, such as the one described briefly above. The method may further include using the first receive signal chain for wireless communications signals having a first signal type and the second receive signal chain for wireless communications signals having a second signal type different than the first signal type.

Figure 1:
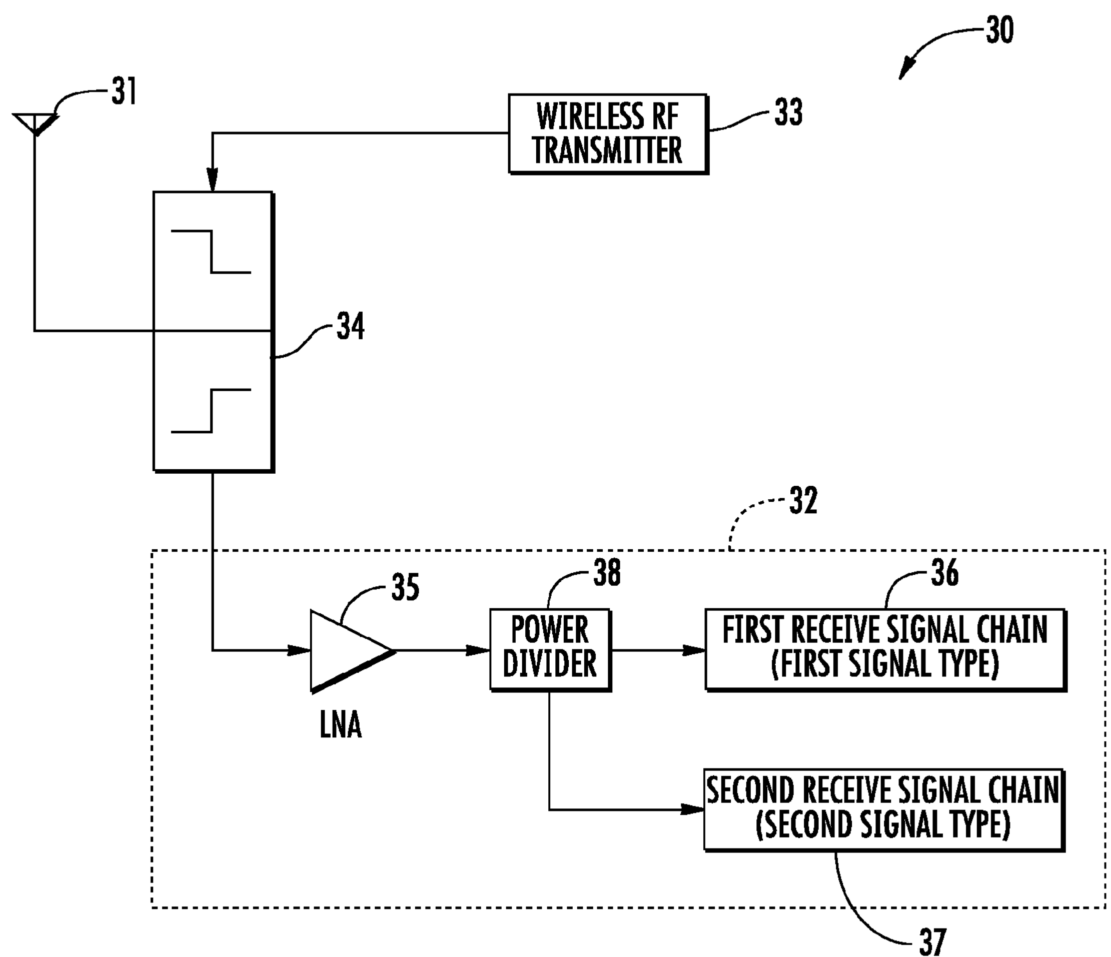
FIG. 1 is a schematic diagram of a mobile wireless communications device including a power divider connecting a low noise amplifier (LNA) to first and second receive signal chains.

Referring initially to FIG. 1, a mobile wireless communications device 30 illustratively includes one or more antennas 31, which may be internal (i.e., included within a device housing) or external (i.e., located at least partially outside the device housing) antennas, as will be appreciated by those skilled in the art. By way of example, the device 30 may operate in accordance with a cellular, wireless LAN (e.g., 802.11x, Bluetooth, etc.), WiMAX, satellite, etc., communications format, as will be appreciated by those skilled in the art. In some embodiments, more than one such wireless communications format may be used in the same device (e.g., cellular, wireless LAN, and Bluetooth). Various types of mobile wireless communications devices 30 may be used, such as mobile phones, PDAs, laptop computers, wireless-enabled cameras, wireless-enabled media players, etc., for example. For convenience of reference, the various embodiments presented herein are in the context of cellular CDMA formats, and more particularly CDMA200 1X and 1X-EVDO applications, but again other wireless communications formats may also be used in different embodiments.

The device 30 further illustratively includes a wireless radio frequency (RF) receiver 32, a wireless RF transmitter 33, and a duplexer 34 connecting the wireless RF receiver and the wireless RF transmitter to the antenna 31. More particularly, the wireless RF receiver 32 illustratively includes a low noise amplifier (LNA) 35 connected to the duplexer 34, and a first receive signal chain 36 for a first signal type (e.g., CDMA2000 1X) downstream from the LNA. A second receive signal chain 37 for a second signal type (e.g., CDMA2000 1X-EVDO) different than the first signal type is also downstream from the LNA 35, and a power divider 38 illustratively connects the LNA to the first and second receive signal chains as shown. As used herein, different "signal types" may mean the signals are of a different format (e.g., CDMA2000 1X vs. CDMA2000 1X-EVDO), different frequencies, have a different coding type, etc., as will be appreciated by those skilled in the art.

In accordance with an exemplary embodiment, the first receive signal chain 36 has a first data rate and is for the first signal type, such as a CDMA2000 1X, and the second receive signal chain 37 has a second data rate greater than the first data rate and is for the second signal type, such as CDMA2000 1X-EVDO. Additionally, at least one of the first and second signal chains 36, 37 may also process voice communications. In this configuration, the first (1X) receive signal chain 36 would be used for voice (and optionally data) communications, while the second (EVDO) receive signal chain 37 would be used for data communications, as will be appreciated by those skilled in the art.

Figure 2:
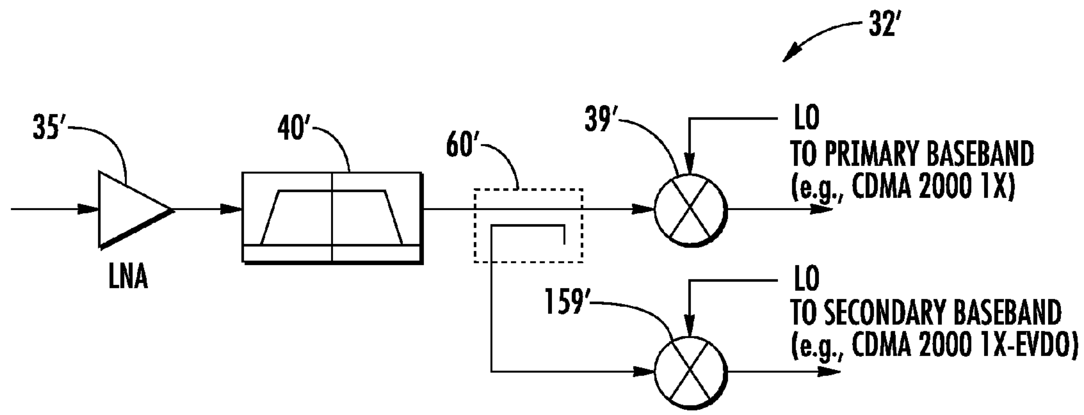
FIG. 2 is schematic diagram of the wireless RF receiver of the device of FIG. 1 with an exemplary power divider configuration.
Figure 3:
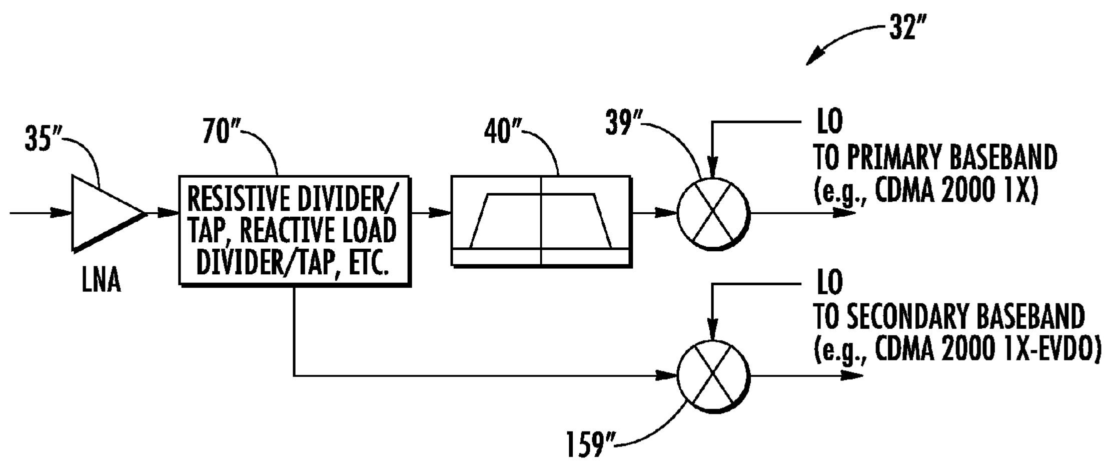
FIG. 3 is schematic diagram of the wireless RF receiver of the device of FIG. 1 with another exemplary power divider configuration.
Figure 5:
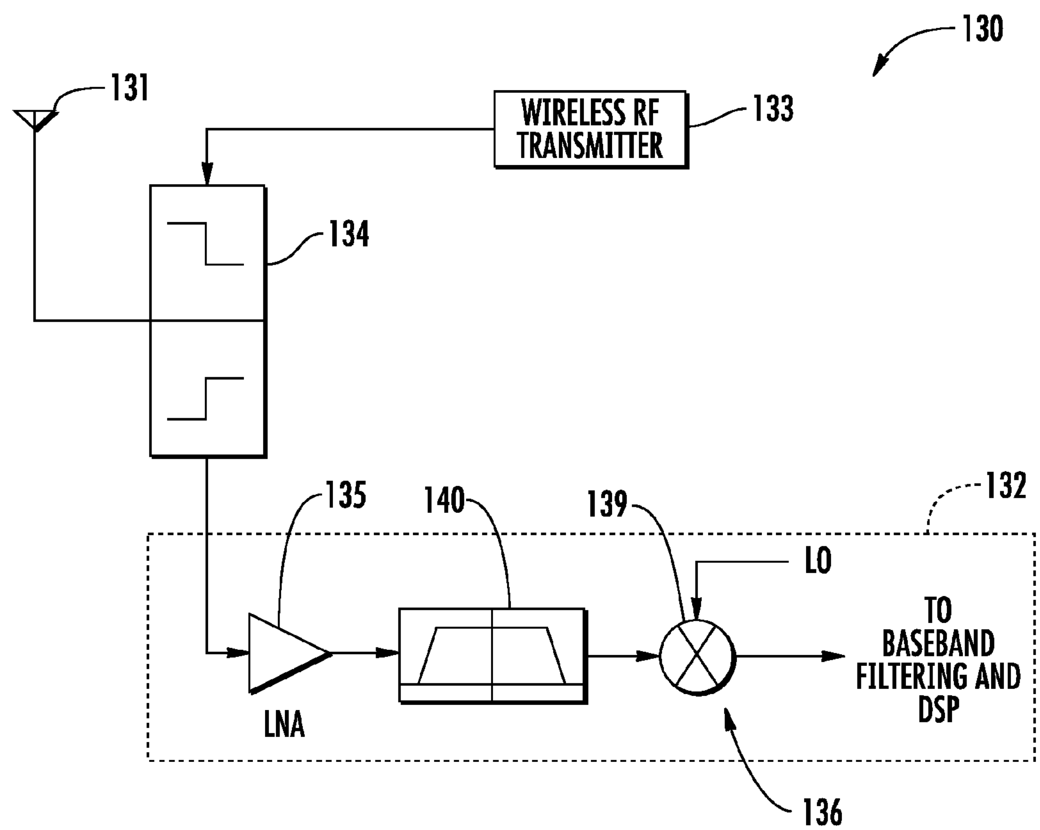
FIG. 5 is a schematic diagram of a prior art mobile wireless communications device embodiment including a single receive chain.

By way of comparison, certain prior art approaches for monitoring paging signals corresponding to different signal formats will now be described with reference FIGS. 5 and 6. For convenience of reference, components in FIGS. 5 and 6 that correspond to those of FIGS. 1-3 are labeled incremented by one hundred (e.g., the duplexer 134 of FIG. 5 is similar to the duplexer 34 of FIG. 1, etc.). In the device 130, a filter 140 (e.g., a bandpass filter such as a surface acoustic wave (SAW) filter) is downstream from the LNA 135 and filters the output thereof, and a single receive chain 136 including a mixer 139 is downstream from the filter. The single receive chain 136 is used to listen for both 1X and EVDO base station paging. For example, the receive chain 136 may be used to listen for 1X base station paging during EVDO operation, as will be appreciated by those skilled in the art. Yet, sharing the same receive signal chain may be disadvantageous in some instances, as this require the control circuitry to change the receive chain 136 back-and-forth between the different 1X and EVDO frequencies, which may undesirably result in a temporary interruption of data downloading, for example.

Figure 6:
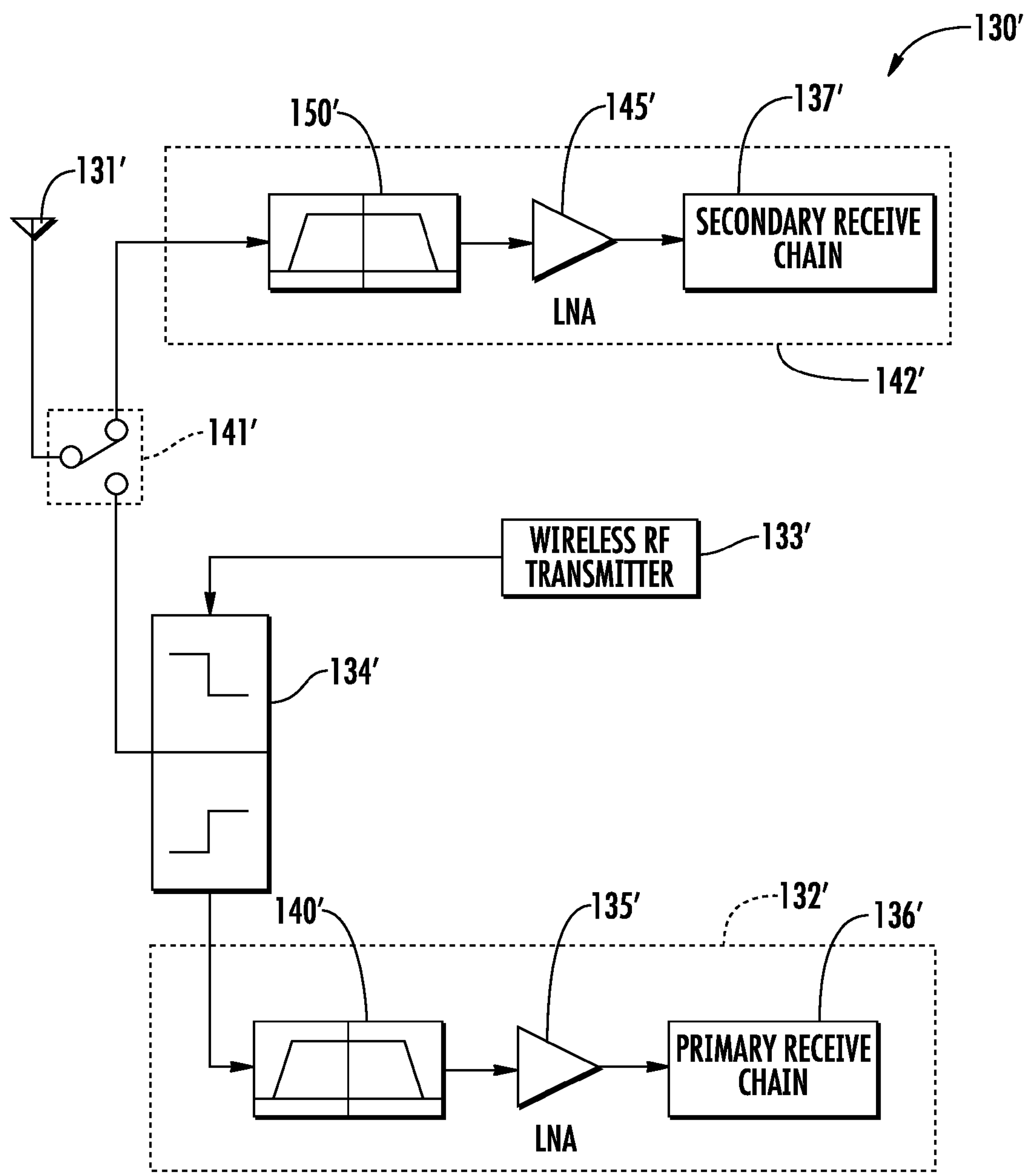
FIG. 6 is a schematic diagram of another prior art mobile wireless communications device embodiment in which a switch is included in the antenna path for switching between a primary transceiver and a secondary receiver chain.

An alternative prior art approach is illustrated in FIG. 6. Here, rather than utilizing a single receive chain 136 as in the device 130 of FIG. 5, a secondary receiver 142' is selectively coupled to the antenna 131' by a multi-pole switch 141'. A blocker filter 150' is downstream from the switch 141', followed by an LNA 145' and the secondary receive signal chain 137' as shown. It will also be noted that in this configuration the filter 140' is upstream from the LNA 135'. In another similar prior art embodiment (not shown), only the receiver signal path is switched after the duplexer 134'. Still, another prior art approach is to eliminate the switch 141' and simply use two separate antennas 131'.

While the device 130' shown in FIG. 6 does have separate or designated receive chains 136', 137' for different paging frequencies (e.g., 1X and EVDO), this configuration also suffers several drawbacks. For example, this approach requires additional components, namely the switch 141' and additional filter 150' and LNA 145', which not only adds to device cost but also increases space requirements, as will be appreciated by those skilled in the art. Another potential disadvantage of this approach is that it may add additional losses either directly or indirectly in the primary receive signal path. More particularly, adding the switch 141' in series with the primary receive signal path may result in the switch losses directly degrading the noise floor of the primary receive signal path (and the secondary receive signal path as well), as will also be appreciated by those skilled in the art.

By way of contrast, the device 30 of FIG. 1 advantageously avoids the signal losses associated with such a front-end switching approach upstream from the LNA 35, and instead moves potential losses from inclusion of the second receive signal chain 37 to a less detrimental position downstream from the LNA. The gain of the LNA 35 advantageously helps suppress the noise floor introduced by the tap of the first receive signal chain 36 by the power divider 38, as will be appreciated by those skilled in the art. That is, tapping the received signal energy after the LNA 35 helps to minimize the impact of signal loss on the first receive signal chain 36, and potentially improves sensitivity by approximately 1 dB or more. To this end, an additional LNA(s) may be used in some embodiments, if desired, as will be appreciated by those skilled in the art. As a result of this configuration, the necessity for the costly (i.e., in terms of money and space) filter elements of the system of figure 130' may advantageously be avoided.

In the present example, the power divider 38 circuitry advantageously taps a portion of the received signal energy after amplification by the LNA 35 so that it may be provided to the second receive signal chain 37, as shown. In accordance with one exemplary embodiment shown in FIG. 2, the power divider takes the form of a directional coupler 60' coupled at the output of an optional filter 40', which in turn is downstream of and coupled to the output of the LNA 35'. In some embodiments the filter 40' may be located downstream of the power divider circuitry (see FIG. 3), as well as upstream of the LNA 35' (as seen in FIG. 6). Also, the first receive signal chain illustratively includes a first mixer 39' receiving as inputs a reference signal LO and the output of the filter 40' (after coupling by the directional coupler 60'), and the second receive signal chain similarly includes a mixer 159' receiving as inputs the reference signal LO and the signal energy tapped by the directional coupler.

Use of the directional coupler 60' advantageously provides a compact implementation, since suitable RF directional couplers are commercially available in relatively small packages, such as from the Murata Manufacturing Co., Ltd., or AVX Corporation, as will be appreciated by those skilled in the art. Moreover, these devices also provide a relatively stable coupling ratio, as will also be appreciated by those skilled in the art.

Additional exemplary power divider circuitry implementations are shown in FIG. 3. Here, power divider circuitry 70" taps the received signal energy downstream of the LNA 35" but upstream of the filter 40". By way of example, the power divider circuitry 70" in this embodiment may take the form of resistive dividers or taps, reactive dividers or taps, resistive or reactive taps, or hybrids, for example, as will be appreciated by those skilled in the art. Tapping upstream of the filter 40" may be desirable, for example, in embodiments where desired rejection is provided by the duplexer and additional sensitivity is required in the second receive signal chain. It should be noted that such taps, dividers, hybrids, etc., may also be used downstream from the filter 40" as shown in FIG. 2, and likewise the directional coupler 60' may also be used upstream of the filter as shown in FIG. 3, as will also be appreciated by those skilled in the art. Generally speaking, a directional coupler may provide advantages in terms of signal loss and space requirements over dividers, taps, hybrids, etc., although the particular component(s) to be used in a given implementation may be a matter of design choice based upon factors such as space constraints, signal tolerances, cost, etc., as will further be appreciated by those skilled in the art.

Figure 4:
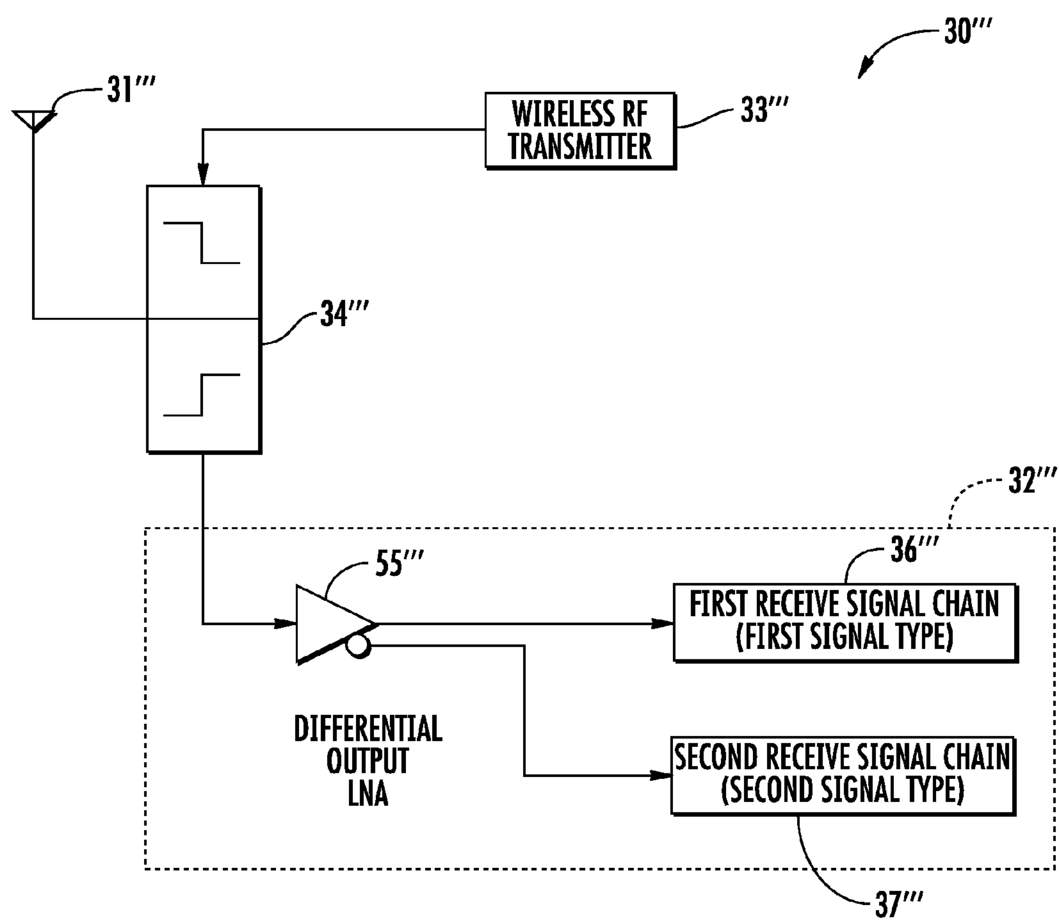
FIG. 4 is a schematic diagram of an alternative embodiment of the wireless RF receiver of the device of FIG. 1 including first and second receive signal chains connected to respective outputs of a differential output LNA.

Another advantageous embodiment is now described with reference to FIG. 4, in which a differential output LNA 55''' is used in place of the power divider circuitry of FIGS. 1-3 to provide a received energy signal to the first receive signal chain 36''' and a second mirror copy of the received energy signal to the second receive signal chain 37''', as will be appreciated by those skilled in the art. Here again, filter circuitry may be provided downstream (or upstream) from the differential output LNA 55''' in some embodiments, if desired. Again, factors such as space constraints, signal tolerances, cost, etc., will affect the choice of which of the above-described configurations to use for a given implementation.

A related mobile wireless communications method may include providing a mobile wireless communications device 30 including the LNA 35 connected to the duplexer 34, the first receive signal chain 36 downstream from the LNA, a second receive signal chain 37 also downstream from the LNA, and the power divider 38 connecting the LNA to the first and second receive signal chains. The method may further include using the first receive signal chain 36 for a first signal type and the second receive signal chain 37 for a second signal type different than the first signal type, as discussed further above.

In accordance with another advantageous method aspect, a mobile wireless communications device 30''' may be provided including the LNA 55''' connected to the duplexer 34''' and having first and second differential outputs, the first receive signal chain 36''' connected to the first differential output of the LNA, and the second receive signal chain 37''' connected to the second differential output of the LNA. The method may further include using the first receive signal chain 36''' for a first signal type and the second receive signal chain 37''' for a second signal type different than the first signal type, as also discussed further above.

Exemplary components that may be used in accordance the above-described mobile wireless communications devices are now described with reference to a mobile wireless communications device 1000 shown in FIG. 7. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 7:
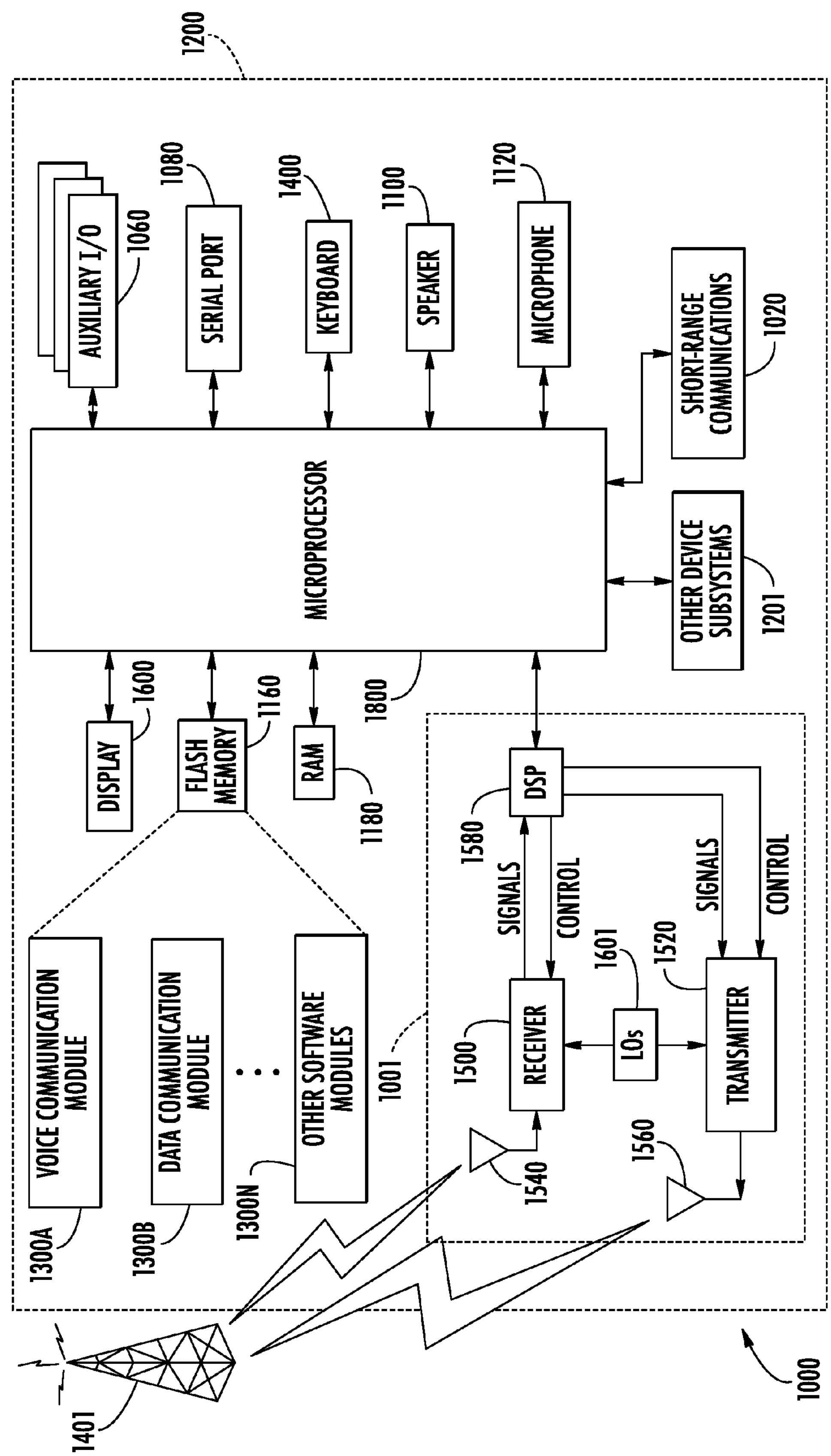
FIG. 7 is a schematic block diagram illustrating exemplary mobile wireless communications device components that may be used in accordance with the embodiments of FIGS. 1 through 3.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is::

1. A mobile wireless communications device comprising:
- an antenna;
- a wireless radio frequency (RF) receiver;
- a wireless RF transmitter; and
- a duplexer connecting said wireless RF receiver and said wireless RF transmitter to said antenna;
- said wireless RF receiver comprising
  - a low noise amplifier (LNA) connected to said duplexer,
  - a first receive signal chain for wireless communications signals having a first signal type downstream from said LNA,
  - a second receive signal chain for wireless communications signals having a second signal type different than the first signal type also downstream from said LNA, and
  - a power divider connecting said LNA to said first and second receive signal chains and comprising at least one of a resistive divider, a resistive tap, a reactive load divider, and a reactive tap.

2. The mobile wireless communications device of claim 1 wherein said first receive signal chain has a first data rate; and wherein said second receive signal chain has a second data rate greater than the first data rate.

3. The mobile wireless communications device of claim 2 wherein at least one of said first and second signal chains also processes voice communications.

4. The mobile wireless communications device of claim 1 wherein the first signal type for said first receive signal chain comprises CDMA2000 1X.

5. The mobile wireless communications device of claim 1 wherein the second signal type for said second receive signal chain comprises CDMA2000 1X-EVDO.

6. The mobile wireless communications device of claim 1 wherein said wireless RF receiver further comprises a filter connected between said LNA and said first and second receive signal chains.

7. The mobile wireless communications device of claim 1 wherein said power divider comprises a directional coupler.

8. The mobile wireless communications device of claim 1 wherein said first receive signal chain comprises a first mixer; and wherein said second receive signal chain comprises a second mixer.

9. A mobile wireless communications device comprising:

an antenna;

a wireless radio frequency (RF) receiver;

a wireless RF transmitter; and a duplexer connecting said wireless RF receiver and said wireless RF transmitter to said antenna;

said wireless RF receiver comprising a low noise amplifier (LNA) connected to said duplexer, a filter downstream from said LNA, a first receive signal chain for a first Code Division Multiple Access (CDMA) signal type downstream from said filter, a second receive signal chain for a second CDMA signal type different than the first CDMA signal type also downstream from said filter, and a power divider connecting said filter to said first and second receive signal chains and comprising at least one of a resistive divider, a resistive tap, a reactive load divider, and a reactive tap.

10. The mobile wireless communications device of claim 9 wherein said first receive signal chain has a first data rate; and wherein said second receive signal chain has a second data rate greater than the first data rate.

11. The mobile wireless communications device of claim 9 wherein said power divider comprises a directional coupler.

12. The mobile wireless communications device of claim 9 wherein the first CDMA signal type for said first receive signal chain comprises CDMA2000 1X; and wherein the second CDMA signal type for said second receive signal chain comprises CDMA2000 1X-EVDO.

13. A mobile wireless communications method comprising:

providing a mobile wireless communications device comprising an antenna, a wireless radio frequency (RF) receiver, a wireless RF transmitter, and a duplexer connecting the wireless RF receiver and the wireless RF transmitter to the antenna, the wireless RF receiver comprising a low noise amplifier (LNA) connected to the duplexer, a first receive signal chain for wireless communications signals having a first signal type downstream from the LNA, a second receive signal chain for wireless communications signals having a second frequency band different than the first signal type also downstream from the LNA, and a power divider connecting the LNA to the first and second receive signal chains, the power divider comprising at least one of a resistive divider, a resistive tap, a reactive load divider, and a reactive tap; and using the first receive signal chain for the wireless communications signals having the first signal type, and using the second receive signal chain for the wireless communications signals having the second signal type different than the first signal type.

14. The method of claim 13 wherein the first receive signal chain has a first data rate; and wherein the second receive signal chain has a second data rate greater than the first data rate.

15. The method of claim 14 wherein at least one of the first and second signal chains also processes voice communications.

16. The method of claim 13 wherein the wireless RF transceiver further comprises a filter connecting the LNA to the first and second receive signal chains.

17. The method of claim 13 wherein the power divider comprises a directional coupler.

18. The method of claim 13 wherein the first signal type for the first receive signal chain comprises CDMA2000 1X; and wherein the second signal type for the second receive signal chain comprises CDMA2000 1X-EVDO.

* * * * *